US010884621B2

(12) United States Patent
Gunjal et al.

(10) Patent No.: US 10,884,621 B2
(45) Date of Patent: Jan. 5, 2021

(54) BLOCK VOLUME MOUNT SYNCHRONIZATION TO PREVENT DATA CORRUPTION

(71) Applicant: International Business Machines Corporation, Armonk, NY (US)

(72) Inventors: Akash V. Gunjal, Belgaum (IN); Shaikh I. Ali, Bangalore (IN); Sushma Korati, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/238,255

(22) Filed: Jan. 2, 2019

(65) Prior Publication Data

US 2020/0210071 A1    Jul. 2, 2020

(51) Int. Cl.
*G06F 3/06* (2006.01)

(52) U.S. Cl.
CPC .......... *G06F 3/0604* (2013.01); *G06F 3/0619* (2013.01); *G06F 3/0622* (2013.01); *G06F 3/0655* (2013.01); *G06F 3/0677* (2013.01); *G06F 3/0679* (2013.01)

(58) Field of Classification Search
None
See application file for complete search history.

(56) References Cited

U.S. PATENT DOCUMENTS

| 8,086,585 | B1 | 12/2011 | Brashers et al. |
| 9,678,683 | B1 | 6/2017 | Chen |
| 9,747,046 | B2 | 8/2017 | Dain et al. |
| 2014/0068127 | A1* | 3/2014 | Baron ............... G06F 9/526 710/200 |
| 2015/0378831 | A1* | 12/2015 | Tarasuk-Levin .... G06F 11/1446 714/15 |
| 2016/0350326 | A1 | 12/2016 | Simonetti |
| 2018/0137139 | A1* | 5/2018 | Bangalore ............. G06F 16/172 |
| 2019/0384738 | A1* | 12/2019 | Prohofsky ............... G06F 3/067 |

OTHER PUBLICATIONS

Mell et al., "The NIST Definition of Cloud Computing," National Institute of Standards and Technology Special Publication 800-145, Sep. 2011, 7 pages.

* cited by examiner

*Primary Examiner* — Denise Tran
(74) *Attorney, Agent, or Firm* — Yee & Associates, P.C.

(57) ABSTRACT

Block volume mount synchronization is provided. A call is received to mount a block volume upon initiation of container generation on the host computer. Metadata of the block volume is checked for host lock prior to mounting the block volume on the host computer. The mounting of the block volume is allowed only when the metadata indicates that prior host lock does not exist thereby restricting usage of the block volume to a single user preventing data corruption of the block volume.

18 Claims, 9 Drawing Sheets

BLOCK VOLUME MOUNT SYNCHRONIZATION TO PREVENT DATA CORRUPTION

BACKGROUND

1. Field

The disclosure relates generally to block data storage and more specifically to synchronizing block volume mounting by locking mount of a particular block volume on a single host server within an entire host server cluster of a cloud environment at any one point in time thereby restricting usage of that particular block volume to a single requesting client device user preventing data corruption of that particular block volume.

2. Description of the Related Art

A storage area network is a dedicated high-speed network or subnetwork that interconnects and presents shared pools of storage devices to multiple host servers. A storage area network moves storage resources off the common user network and reorganizes the storage resources into an independent, high-performance network. This reorganization of storage resources enables each host server to access shared storage as if it were a drive directly attached to the host server. When a host server wants to access a storage device on the storage area network, the host server sends out a block-based access request for the storage device.

Block storage is data storage typically used in storage-area network environments where data is stored in volumes, also referred to as blocks. Each block volume acts as an individual hard disk drive and is configured by a storage administrator. These block volumes are controlled by server-based operating systems, and are generally accessed by Internet Small Computer Systems Interface (iSCSI) protocol. Because the block volumes are treated as individual hard disk drives, block storage works well for storing a variety of applications. File system and database applications commonly use block storage because these types of applications consistently require high performance.

SUMMARY

According to one illustrative embodiment, a computer-implemented method for block volume mount synchronization is provided. A host computer receives a call to mount a block volume upon initiation of container generation on the host computer. The host computer checks metadata of the block volume for host lock prior to mounting the block volume on the host computer. The host computer allows the mounting of the block volume only when the metadata indicates that prior host lock does not exist thereby restricting usage of the block volume to a single user preventing data corruption of the block volume. According to other illustrative embodiments, a computer system and computer program product for block volume mount synchronization are provided.

DETAILED DESCRIPTION

Figure 1:
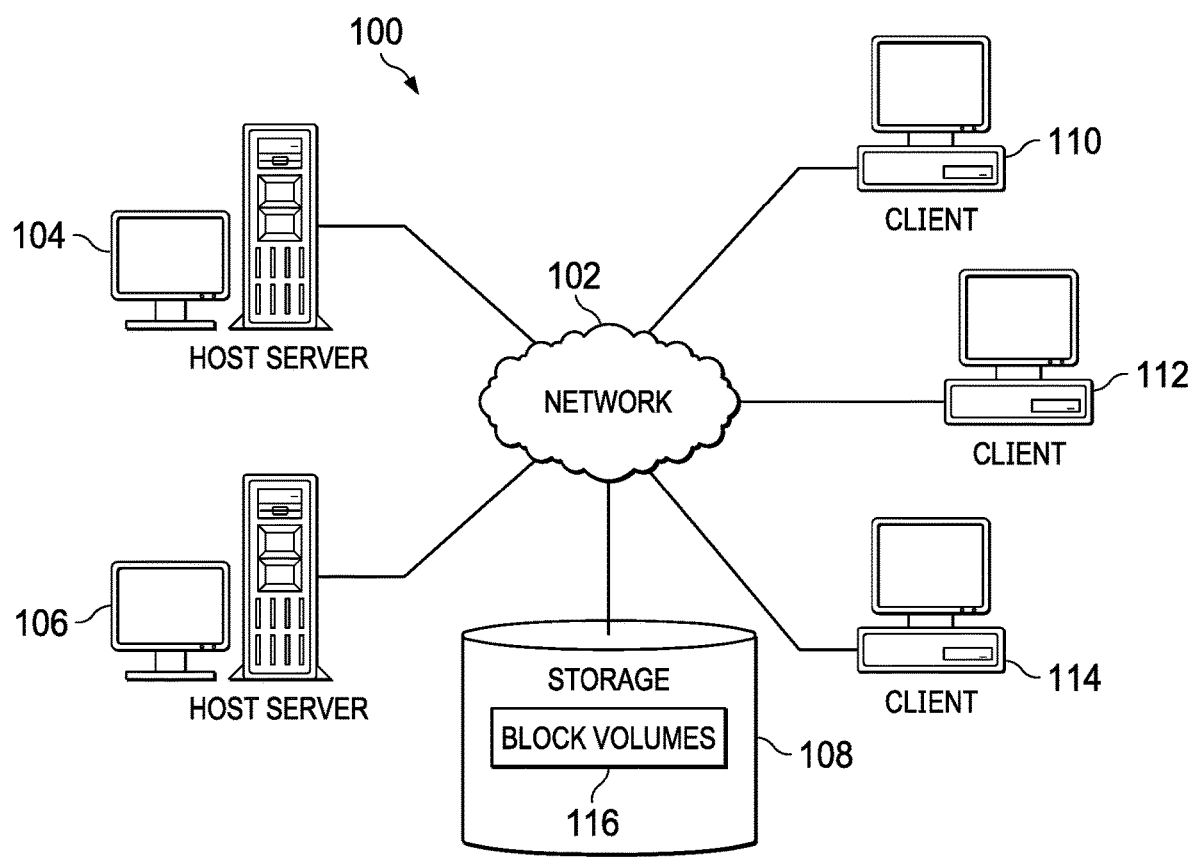
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, host server 104 and host server 106 connect to network 102, along with storage 108. Host server 104 and host server 106 may be, for example, server computers with high-speed connections to network 102. In addition, host server 104 and host server 106 may be included in a cluster of servers within a cloud environment that provides storage area network services, for example. Alternatively, host server 104 and host server 106 may represent a cluster of servers in a data center.

Client 110, client 112, and client 114 also connect to network 102. Clients 110, 112, and 114 are clients of server 104 and/or server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, and the like. Users of clients 110, 112, and 114 may utilize clients 110, 112, and 114 to send requests for mounting a block volume of block volumes 116 on host server 104 or host server 106. In addition, users of clients 110, 112, and 114 may utilize clients 110, 112, and 114 to perform operations, such as create, read, update, and delete operations, on data of a mounted block volume on host server 104 or host server 106.

Storage 108 is a network storage device capable of storing any type of data in a structured format or an unstructured format. In addition, storage 108 may represent a plurality of network storage devices. The plurality of network storage devices may comprise a storage area network, for example. In this example, storage 108 stores block volumes 116. Block volumes 116 represent a plurality of different block volumes. Each block volume acts as an individual hard disk drive. In other words, each block volume provides persistent, high performance data storage. Once a block volume is mounted on a host server, the host server can use the block volume as a regular hard disk drive. A block volume may also be unmounted and remounted on a different host server without loss of data.

Storage 108 may also store identifiers and network addresses for a plurality of different host servers, identifiers and network addresses for a plurality of different client devices, and the like. Further, storage unit 108 may store other types of data, such as authentication or credential data that may include user names, passwords, and biometric data associated with users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on host server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
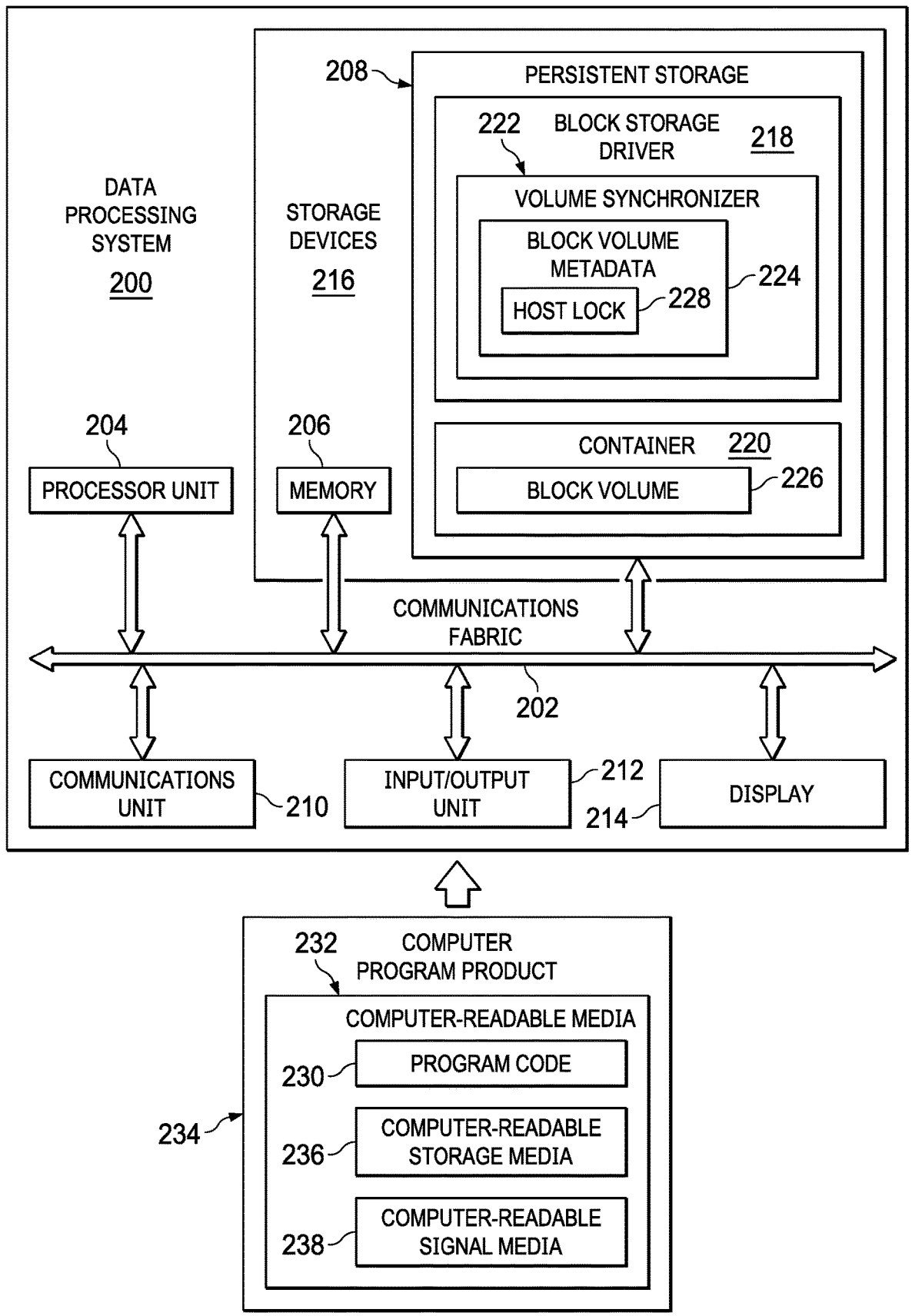
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as host server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores block storage driver 218 and container 220. It should be noted that even though block storage driver 218 is illustrated as residing in persistent storage 208, in an alternative illustrative embodiment block storage driver 218 may be a separate component of data processing system 200. For example, block storage driver 218 may be a hardware component coupled to communication fabric 202 or a combination of hardware and software components.

Block storage driver 218 controls the process of synchronizing block volume mounting. Block storage driver 218 utilizes volume synchronizer 222, which is a component of block storage driver 218, to control synchronization of a block volume mount by locking mount of a particular block volume, such as block volume 226, on data processing system 200 for a period of time. As a result, volume synchronizer 222 restricts usage of block volume 226 to a single requesting client device user, which prevents data corruption of block volume 226 by preventing multiple mounts of block volume 226 on different host machines by different client device users at the same time.

In response to block storage driver 218 of data processing system 200 receiving a request to mount block volume 226 on container 220, volume synchronizer 222 retrieves block volume metadata 224, which corresponds to block volume 226, from a centralized block volume metadata repository. Volume synchronizer 222 analyzes block volume metadata 224 to determine whether a host lock, such as host lock 228, currently exists on block volume 226. Host lock 228 identifies the host machine that currently has a lock on block volume 226. In this example, host lock 228 does not initially exist in block volume metadata 224. In other words, in this example host lock 228 is initially a null data set, which means that block volume 226 is available for mounting.

In response to determining that a host lock does not exist on block volume 226, volume synchronizer 222 updates host lock 228 of block volume metadata 224 to include information corresponding to data processing system 200, such as, for example, an identifier of data processing system 200. In other words, host lock 228 now indicates that data processing system 200 currently has host lock on block volume 226. Volume synchronizer 222 then stores on the centralized block volume metadata repository block volume metadata 224, which contains host lock 228 indicating that data processing system 200 now has host lock on block volume 226. In addition, because data processing system 200 now has host lock on block volume 226, block volume driver 218 mounts block volume 226 on container 220. Container 220 uses block volume 226 to run an application, such as, for example, a database or file system.

In response to block storage driver 218 receiving a request to unmount block volume 226 from container 220, volume synchronizer 222 again retrieves block volume metadata 224 from the centralized block volume metadata repository. Volume synchronizer 222 then removes or deletes the information corresponding to data processing system 200 from host lock 228 indicating that block volume 226 is again available for mounting by a host machine. Volume synchronizer 222 stores updated block volume metadata 224 on the centralized block volume metadata repository for access by other volume synchronizers of other host machines.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 230 is located in a functional form on computer readable media 232 that is selectively removable and may be loaded onto or transferred to data processing system 200 for running by processor unit 204. Program code 230 and computer readable media 232 form computer program product 234. In one example, computer readable media 232 may be computer readable storage media 236 or computer readable signal media 238. Computer readable storage media 236 may include, for example, an optical or magnetic disc that is inserted or placed into a drive or other device that is part of persistent storage 208 for transfer onto a storage device, such as a hard drive, that is part of persistent storage 208. Computer readable storage media 236 also may take the form of a persistent storage, such as a hard drive, a thumb drive, or a flash memory that is connected to data processing system 200. In some instances, computer readable storage media 236 may not be removable from data processing system 200.

Alternatively, program code 230 may be transferred to data processing system 200 using computer readable signal media 238. Computer readable signal media 238 may be, for example, a propagated data signal containing program code 230. For example, computer readable signal media 238 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 230 may be downloaded over a network to persistent storage 208 from another device or data processing system through computer readable signal media 238 for use within data processing system 200. For instance, program code stored in a computer readable storage media in a data processing system may be downloaded over a network from the data processing system to data processing system 200. The data processing system providing program code 230 may be a server computer, a client computer, or some other device capable of storing and transmitting program code 230.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 236 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
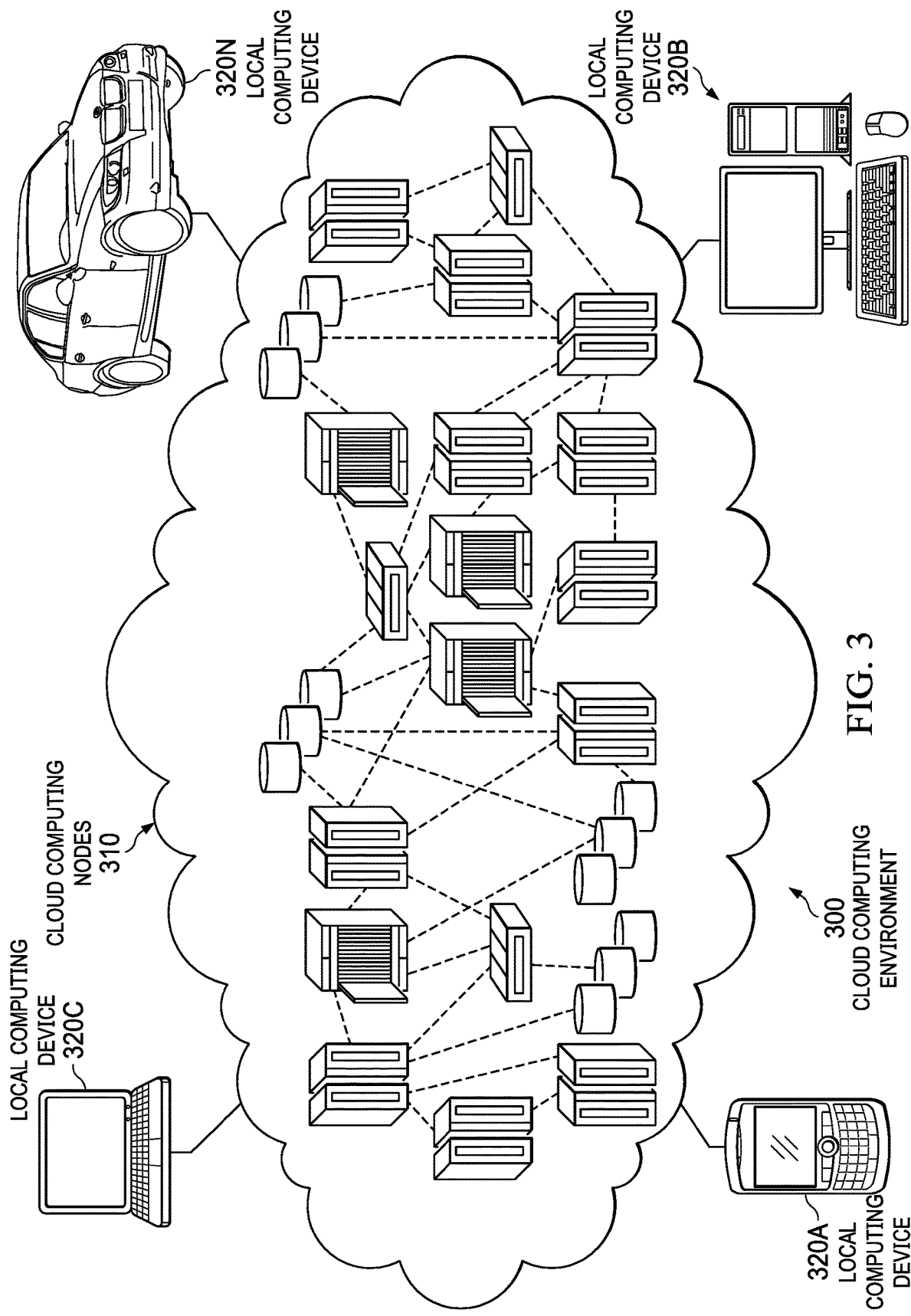
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
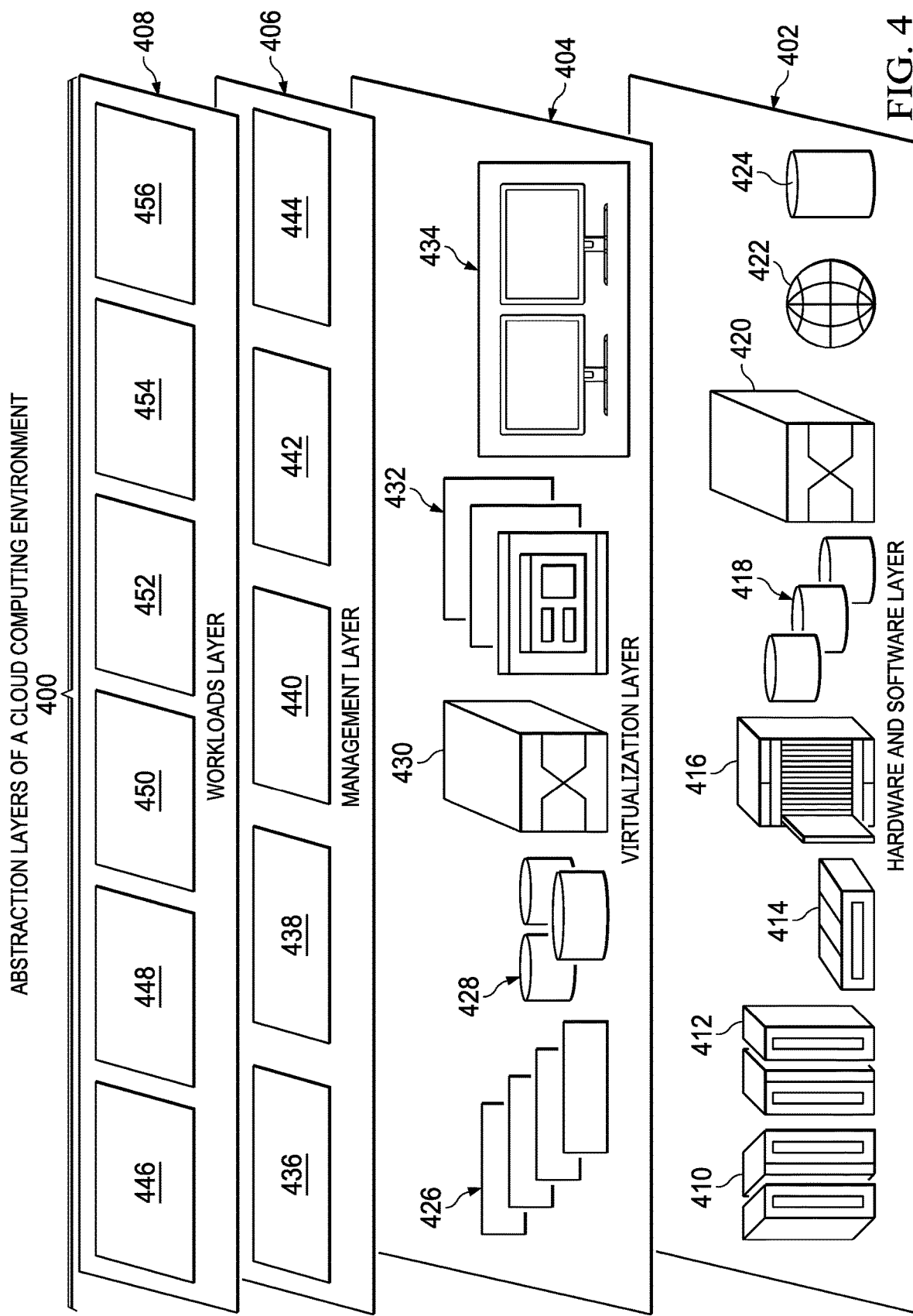
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer)

architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and block volume mount synchronization management 456.

Various types of cloud orchestrators commonly utilize block volumes for data storage. These block volumes are configured so that a block volume cannot be shared for simultaneous I/O operations by multiple data consumers. Only a single data consumer can perform a write operation at any point of time. This enables a block volume to be very fast in terms of performance as compared to other types of storage options. Hence, block volumes are the most used data storage across the industry.

However, when a particular block volume is mounted on multiple hosts in a cloud environment and users try to write data simultaneously across all the mounted block volumes on the multiple hosts, the data becomes corrupted and eventually corrupts the block volume making the block volume unusable. This also leads to I/O hang for block volumes mounted on other hosts. The iSCSI protocol, which is used to communicate with the block volumes, will not lock a block volume for a single I/O operation. As a result, locking a block volume for the I/O operation rests with the user using that particular block volume to ensure that the I/O operation is performed on the block volume by a single host server at any one point of time.

Corruption of a block volume is due to the usage of the block volume by multiple users at the same time within a cloud environment. Illustrative embodiments restrict mounting of a block volume to a single host server in the entire cloud environment at any one point of time. Illustrative embodiments utilize a block volume driver that is deployed and running on each host server within the cloud environment. This block volume driver is responsible for mounting a block volume on its corresponding host server. The block volume driver receives a block volume mount request from a cloud orchestrator, such as, for example, Kubernetes or open stack, in response to a cloud user requesting mount of the block volume on the host server. A cloud orchestrator automates deployment, scaling, and operations of application containers across a cluster of host servers. A scheduler of the cloud orchestrator selects which host server in the cluster a container runs on based on resource availability. A host server is a machine where a container is deployed. A host server may be a physical machine or a virtual machine depending on the cluster. A container holds a running application, which uses the block volume mounted on the host server. The container is exposed to the world via an external Internet Protocol address.

The components of illustrative embodiments synchronize the block volume across the cluster of host servers within the cloud environment and ensure that the block volume is not mounted or attempted to be mounted by multiple host servers at the same time. When a host server, which has mounted the block volume, is rebooted or restarted due to failure and the container using the block volume is moved to another healthy host server, the components of illustrative embodiments synchronize the block volume such that the stale mount of the block volume in old host server, which was rebooted, will be removed from the metadata and the healthy host will be allowed to mount the block volume. This process is an automatic synchronization performed by the components of illustrative embodiments during container transfer within the cluster of host servers.

The block volume cannot be used to be mounted on a new container until the components of illustrative embodiments unmount the block volume from the existing container and release the block volume. This automatic process performed by components of illustrative embodiments ensures that no data corruption and I/O hangs occur for that block volume.

Illustrative embodiments deploy a block volume driver, which mounts the block volume, on each host in the cloud environment. The cloud orchestrator calls the block volume driver to mount the block volume whenever container creation is initiated on a host server. Metadata corresponding to the block volume is available to the cloud orchestrator. This metadata stores the host server information to which the block volume is mounted.

Once the cloud orchestrator calls a block volume driver for mounting a block volume on a corresponding host server, the volume synchronizer of the block volume driver determines from the block volume metadata whether a host lock exists on some host server within the cluster. If the volume synchronizer determines that the block volume is not currently locked on a host server, then the block volume driver mounts the block volume on its corresponding host server and the volume synchronizer updates the block volume metadata to indicate a host lock of the block volume on the currently mounting host server. Thus, illustrative embodiments synchronize the block volume by locking the mount onto a single host server ensuring data security and preventing data loss due to corruption. Consequently, illustrative embodiments enable host locking of the block volume outside the iSCSI protocol by synchronizing the block volume across the cluster of host servers within the cloud environment.

Figure 5:
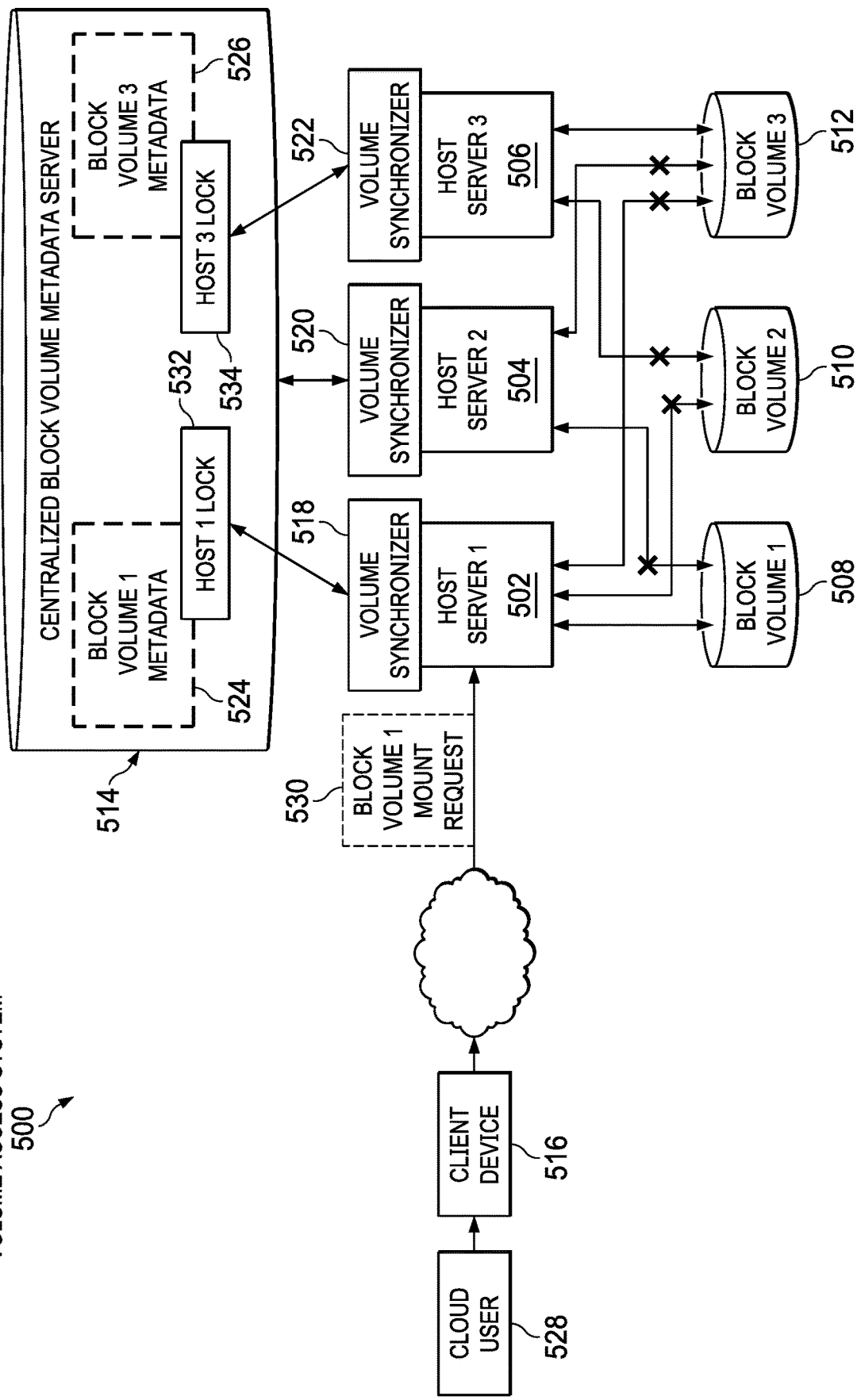
FIG. 5 is a diagram illustrating an example of a host server block volume access system in accordance with an illustrative embodiment.

With reference now to FIG. 5, a diagram illustrating an example of a host server block volume access system is depicted in accordance with an illustrative embodiment. Host server block volume access system 500 may be implemented in a network of data processing systems, such as network data processing system 100 in FIG. 1, or a cloud computing environment, such as cloud computing environment 300 in FIG. 3. Host server block volume access system 500 is a system of hardware and software components for synchronizing block volume mounting by locking mount of a particular block volume on a single host server within an entire host server cluster of a cloud environment at any one point in time thereby restricting usage of that particular block volume to a single requesting user to prevent data corruption of that particular block volume.

In this example, host server block volume access system 500 includes host server 1 502, host server 2 504, host server 3 506, block volume 1 508, block volume 2 510, block volume 3 512, centralized block volume metadata server 514, and client device 516. However, it should be noted that host server block volume access system 500 is only intended as an example and not as a limitation on illustrative embodiments. In other words, host server block volume access system 500 may include any number of host servers, block volumes, client devices, and other devices not shown.

Host server 1 502 includes volume synchronizer 518, host server 2 504 includes volume synchronizer 520, and host server 3 506 includes volume synchronizer 522. In this example, centralized block volume metadata server 514 stores block volume metadata 1 524, which corresponds to block volume 1 508, and block volume metadata 3 526, which corresponds to block volume 3 512. However, it should be noted that centralized block volume metadata server 514 stores metadata for each respective block volume located within host server block volume access system 500.

Cloud user 528 utilizes client device 516 to send block volume 1 mount request 530. Block volume 1 mount request 530 is a request to mount block volume 1 508 on host server 1 502. In response to host server 1 502 receiving block volume 1 mount request 530, volume synchronizer 518 checks block volume 1 metadata 524 to see if a host lock currently exists on block volume 1 508. In response to volume synchronizer 518 determining that a host lock does not currently exist on block volume 1 508 based on analysis of block volume 1 metadata 524, volume synchronizer 518 adds host server 1 lock 532 to block volume 1 metadata 524. In addition, a block volume driver of host server 1 502 mounts block volume 1 508 on a container of host server 1 502.

As a result, host server 1 502 now has exclusive access to block volume 1 508. In other words, no other host server can access block volume 1 508 as long as host server 1 502 maintains host lock on block volume 1 508. In addition, it should be noted that host server 1 502 cannot access another block volume while maintaining host lock on block volume 1 508. Also in this example, host server 3 506 has host lock on block volume 3 512. In other words, block volume 3 metadata 526 includes host server 3 lock 534 indicating that host server 3 506 currently has host lock on block volume 3 512.

Figure 6:
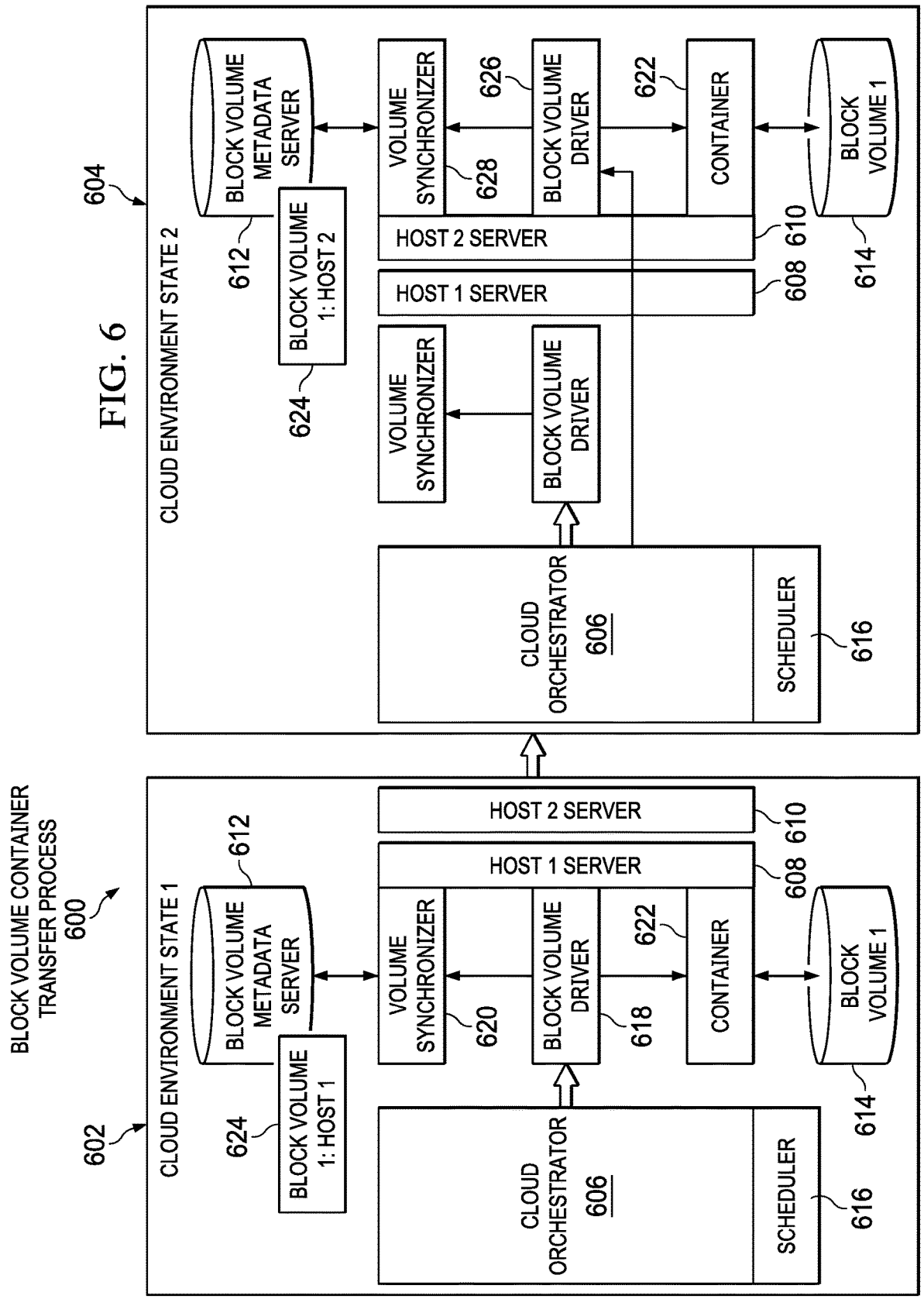
FIG. 6 is a diagram illustrating an example of a block volume container transfer process in accordance with an illustrative embodiment.

With reference now to FIG. 6, a diagram illustrating an example of a block volume container transfer process is depicted in accordance with an illustrative embodiment. Block volume container transfer process 600 may be implemented in, for example, a cloud computing environment, such as cloud computing environment 300 in FIG. 3. In this example, block volume container transfer process 600 includes cloud environment state 1 602 and cloud environment state 2 604.

Cloud environment state 1 602 and cloud environment state 2 604 represent different states of a cloud environment during transfer of a container, which is using a particular block volume, to a new host server by a cloud orchestrator when the original host server goes down. In this example, block volume container transfer process 600 utilizes cloud orchestrator 606, host server 1 608, host server 2 610, block volume metadata server 612, block volume 1 614, and scheduler 616. Host server 1 608 includes block volume driver 618, volume synchronizer 620, and container 622. It should be noted that volume synchronizer 620 is a component of block volume driver 618.

In cloud environment state 1 602, cloud orchestrator 606 utilizes scheduler 616 to schedule container 622, which is using block volume 1 614, on host server 1 608. Block volume driver 618 mounts block volume 1 614 on container 622. In addition, volume synchronizer 620 updates block volume 1 metadata 624 in block volume metadata server 612 to indicate that block volume 1 614 is host locked by host server 1 608.

In cloud environment state 2 604, host server 1 608 is down. As a result, cloud orchestrator 606 transfers container 622 to host server 2 610. Host server 2 610 includes block volume driver 626, volume synchronizer 628, and container 622, which continues to use block volume 1 614. Volume synchronizer 628 updates block volume 1 metadata 624 in block volume metadata server 612 to indicate that block volume 1 614 is now host locked by host server 2 610.

Figure 7:
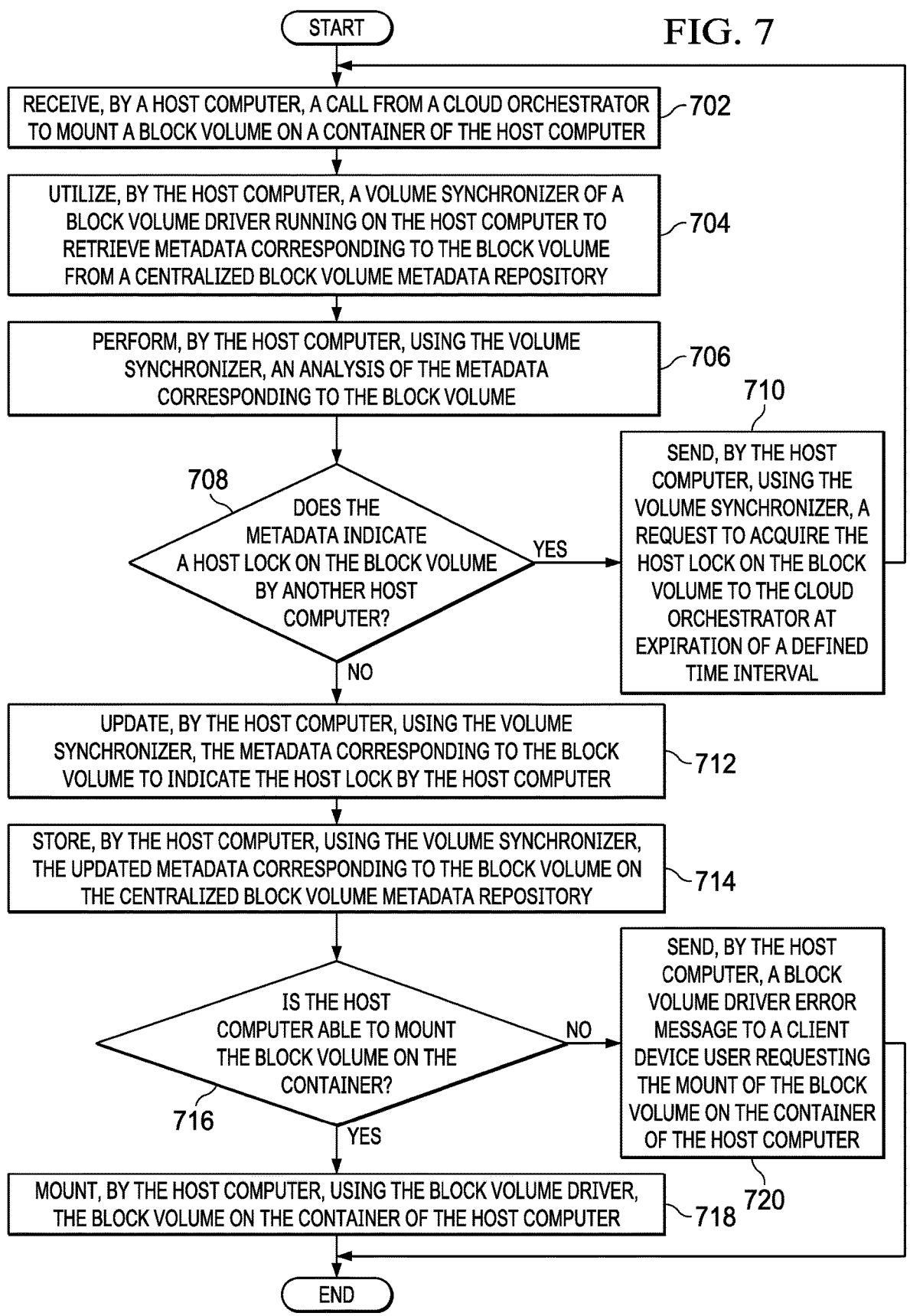
FIG. 7 is a flowchart illustrating a process for mounting a block volume in accordance with an illustrative embodiment.

With reference now to FIG. 7, a flowchart illustrating a process for mounting a block volume is shown in accordance with an illustrative embodiment. The process shown in FIG. 7 may be implemented in a host computer, such as, for example, host server 104 in FIG. 1, data processing system 200 in FIG. 2, a cloud computing node in cloud computing nodes 310 of cloud computing environment 300 in FIG. 3, host server 1 502 in FIG. 5, or host server 1 608 in FIG. 6.

The process begins when the host computer receives a call from a cloud orchestrator to mount a block volume on a container of the host computer (step 702). The cloud orchestrator may be, for example, cloud orchestrator 606 in FIG. 6. The block volume and container may be, for example, block volume 1 614 and container 622 in FIG. 6. It should be noted that the cloud orchestrator receives a request to mount the block volume from a client device user, such as, for example, block volume 1 mount request 530 from cloud user 528 who corresponds to client device 516 in FIG. 5.

In response to receiving the call to mount the block volume in step 702, the host computer utilizes a volume synchronizer of a block volume driver running on the host computer to retrieve metadata corresponding to the block volume from a centralized block volume metadata repository (step 704). The volume synchronizer of the block volume driver may be, for example, volume synchronizer 620 of block volume driver 618 in FIG. 6. The metadata may be, for example, block volume 1 metadata 624 in FIG. 6. The centralized block volume metadata repository may be, for example, block volume metadata server 612 in FIG. 6.

The host computer, using the volume synchronizer, performs an analysis of the retrieved metadata corresponding to the block volume (step 706). The host computer makes a determination as to whether the retrieved metadata indicates a host lock on the block volume by another host computer based on the analysis of the retrieved metadata by the volume synchronizer (step 708). If the host computer determines that the retrieved metadata does indicate a host lock on the block volume by another host computer, yes output of step 708, then the host computer, using the volume synchronizer, automatically sends a request to acquire the host lock on the block volume to the cloud orchestrator at expiration of a defined time interval (step 710). The defined time interval may be, for example, 1 minute, 3 minutes, 5 minutes, 10 minutes, or any other predefined increment of time. Thereafter, the process returns to step 702 where the computer waits to receive another call from the cloud orchestrator to mount the block volume.

If the host computer determines that the retrieved metadata does not indicate a host lock on the block volume by another host computer, no output of step 708, then the host computer, using the volume synchronizer, updates the retrieved metadata corresponding to the block volume to indicate the host lock by the host computer (step 712). The volume synchronizer may update the retrieved metadata to indicate that the host computer has a host lock on the block volume by, for example, adding or inserting identification information corresponding to the host computer in the retrieved metadata. In addition, the host computer, using the volume synchronizer, stores the updated metadata corresponding to the block volume on the centralized block volume metadata repository (step 714).

Further, the host computer makes a determination as to whether the host computer is able to mount the block volume on the container (step 716). If the host computer determines that the host computer is able to mount the block volume on the container, yes output of step 716, then the host computer, using the block volume driver, mounts the block volume on the container of the host computer (step 718). Thereafter, the process terminates. If the host computer determines that the host computer is unable to mount the block volume on the container, no output of step 716, then the host computer sends a block volume driver error message to the client device user requesting the mount of the block volume on the container of the host computer (step 720). Thereafter, the process terminates.

Figure 8:
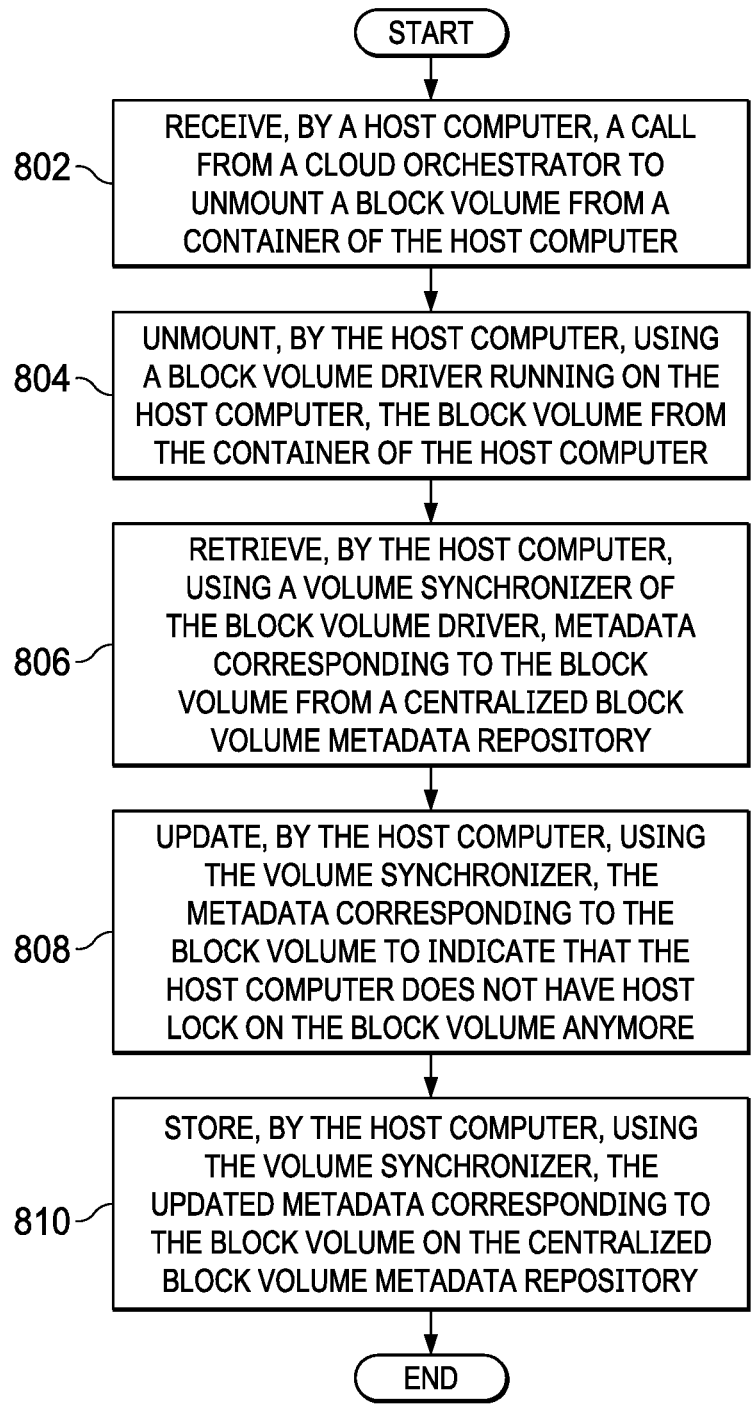
FIG. 8 is a flowchart illustrating a process for unmounting a block volume in accordance with an illustrative embodiment.

With reference now to FIG. 8, a flowchart illustrating a process for unmounting a block volume is shown in accordance with an illustrative embodiment. The process shown in FIG. 8 may be implemented in a host computer, such as, for example, host server 104 in FIG. 1, data processing system 200 in FIG. 2, a cloud computing node in cloud computing nodes 310 of cloud computing environment 300 in FIG. 3, host server 1 502 in FIG. 5, or host server 1 608 in FIG. 6.

The process begins when the host computer receives a call from a cloud orchestrator to unmount a block volume from a container of the host computer (step 802). In response, the host computer, using a block volume driver running on the host computer, unmounts the block volume from the container of the host computer (step 804).

The host computer, using a volume synchronizer of the block volume driver, also retrieves metadata corresponding to the block volume from a centralized block volume metadata repository (step 806). The host computer, using the volume synchronizer, updates the metadata corresponding to the block volume to indicate that the host computer does not have host lock on the block volume anymore (step 808). The volume synchronizer may update the metadata to indicate that the host computer does not have host lock on the block volume anymore by, for example, removing or deleting identification information corresponding to the host computer from the metadata. Further, the host computer, using the volume synchronizer, stores the updated metadata corresponding to the block volume on the centralized block volume metadata repository (step 810). Thereafter, the process terminates.

Figure 9:
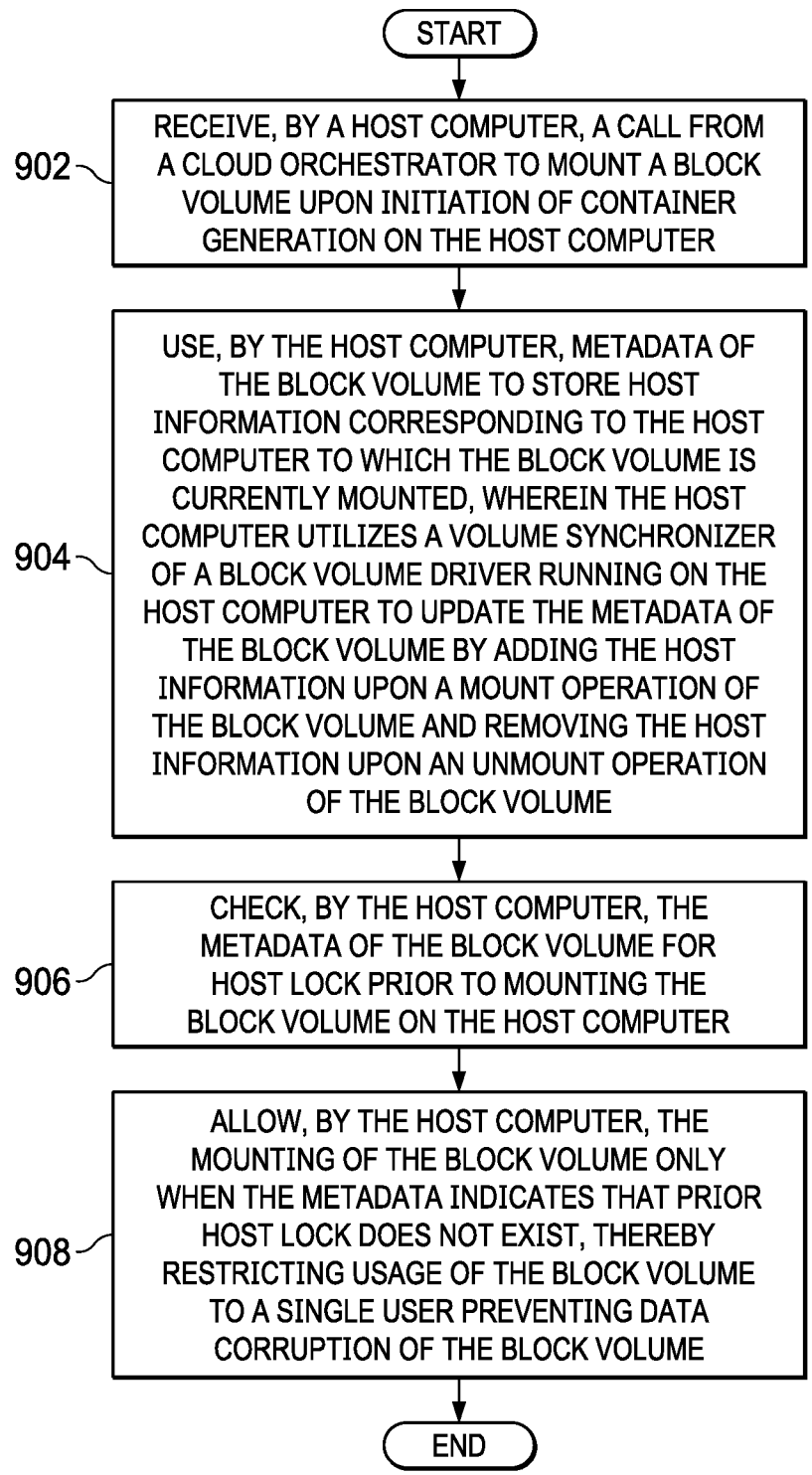
FIG. 9 is a flowchart illustrating a process for synchronizing block volume mount in accordance with an illustrative embodiment.

With reference now to FIG. 9, a flowchart illustrating a process for synchronizing block volume mount is shown in accordance with an illustrative embodiment. The process shown in FIG. 9 may be implemented in a host computer, such as, for example, host server 104 in FIG. 1, data processing system 200 in FIG. 2, a cloud computing node in cloud computing nodes 310 of cloud computing environment 300 in FIG. 3, host server 1 502 in FIG. 5, or host server 1 608 in FIG. 6.

The process begins when the host computer receives a call from a cloud orchestrator to mount a block volume upon initiation of container generation on the host computer (step 902). The host computer uses metadata of the block volume to store host information corresponding to the host computer to which the block volume is currently mounted (step 904). The host computer utilizes a volume synchronizer of a block volume driver running on the host computer to update the metadata of the block volume by adding the host information upon a mount operation of the block volume and removing the host information upon an unmount operation of the block volume.

The host computer checks the metadata of the block volume for host lock prior to mounting the block volume on the host computer (step 906). The host computer allows the mounting of the block volume only when the metadata indicates that prior host lock does not exist, thereby restricting usage of the block volume to a single user to prevent data corruption of the block volume (step 908). Thereafter, the process terminates.

Thus, illustrative embodiments of the present invention provide a computer-implemented method, computer system, and computer program product for synchronizing block volume mounting by locking mount of a particular block volume on a single host server within an entire host server cluster of a cloud environment at any one point in time thereby restricting usage of that particular block volume to a single requesting user to prevent data corruption of that particular block volume. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for block volume mount synchronization, the computer-implemented method comprising:

receiving, by a host computer, a call to mount a block volume upon initiation of container generation on the host computer, wherein the host computer is included in a cluster of host computers in a cloud environment, each respective host computer in the cluster of host computers in the cloud environment includes a block volume driver that performs block volume mounting synchronization;

checking, by the host computer, metadata of the block volume for host lock prior to mounting the block volume on the host computer; and allowing, by the host computer, the mounting of the block volume only when the metadata indicates that prior host lock does not exist thereby restricting usage of the block volume to a single user preventing data corruption of the block volume.

2. The computer-implemented method of claim 1 further comprising:
using, by the host computer, the metadata of the block volume to store host information corresponding to the host computer to which the block volume is currently mounted.

3. The computer-implemented method of claim 2, wherein the host computer utilizes a volume synchronizer of a block volume driver running on the host computer to update the metadata of the block volume by adding the host information upon a mount operation of the block volume.

4. The computer-implemented method of claim 2, wherein the host computer utilizes a volume synchronizer of a block volume driver running on the host computer to update the metadata of the block volume by removing the host information upon an unmount operation of the block volume.

5. The computer-implemented method of claim 1 further comprising:
responsive to the host computer determining that the metadata indicates prior host lock on the block volume, sending, by the host computer, a request to acquire host lock on the block volume to a cloud orchestrator at expiration of a defined time interval.

6. The computer-implemented method of claim 1 further comprising:
retrieving, by the host computer, the metadata of the block volume from a centralized block volume metadata repository, wherein the centralized block volume metadata repository stores a plurality of different metadata for a plurality of different block volumes.

7. The computer-implemented method of claim 1, wherein the host computer receives the call to mount the block volume from a cloud orchestrator.

8. A host computer system for block volume mount synchronization, the host computer system comprising:
a bus system;
a storage device connected to the bus system, wherein the storage device stores program instructions; and
a processor connected to the bus system, wherein the processor executes the program instructions to:
receive a call to mount a block volume upon initiation of container generation on the host computer system, wherein the host computer is included in a cluster of host computers in a cloud environment, each respective host computer in the cluster of host computers in the cloud environment includes a block volume driver that performs block volume mounting synchronization;
check metadata of the block volume for host lock prior to mounting the block volume on the host computer system; and
allow the mounting of the block volume only when the metadata indicates that prior host lock does not exist thereby restricting usage of the block volume to a single user preventing data corruption of the block volume.

9. The host computer system of claim 8, wherein the processor further executes the program instructions to:
use the metadata of the block volume to store host information corresponding to the host computer system to which the block volume is currently mounted.

10. The host computer system of claim 9, wherein the host computer system utilizes a volume synchronizer of a block volume driver running on the host computer system to update the metadata of the block volume by adding the host information upon a mount operation of the block volume.

11. The host computer system of claim 9, wherein the host computer system utilizes a volume synchronizer of a block volume driver running on the host computer system to update the metadata of the block volume by removing the host information upon an unmount operation of the block volume.

12. The host computer system of claim 8, wherein the processor further executes the program instructions to:
send a request to acquire host lock on the block volume to a cloud orchestrator at expiration of a defined time interval in response to determining that the metadata indicates prior host lock on the block volume.

13. A computer program product for block volume mount synchronization, the computer program product comprising a computer readable storage medium having program instructions embodied therewith, the program instructions executable by a host computer to cause the host computer to perform a method comprising:
receiving, by the host computer, a call to mount a block volume upon initiation of container generation on the host computer, wherein the host computer is included in a cluster of host computers in a cloud environment, each respective host computer in the cluster of host computers in the cloud environment includes a block volume driver that performs block volume mounting synchronization;
checking, by the host computer, metadata of the block volume for host lock prior to mounting the block volume on the host computer; and
allowing, by the host computer, the mounting of the block volume only when the metadata indicates that prior host lock does not exist thereby restricting usage of the block volume to a single user preventing data corruption of the block volume.

14. The computer program product of claim 13 further comprising:
using, by the host computer, the metadata of the block volume to store host information corresponding to the host computer to which the block volume is currently mounted.

15. The computer program product of claim 14, wherein the host computer utilizes a volume synchronizer of a block volume driver running on the host computer to update the metadata of the block volume by adding the host information upon a mount operation of the block volume.

16. The computer program product of claim 14, wherein the host computer utilizes a volume synchronizer of a block volume driver running on the host computer to update the metadata of the block volume by removing the host information upon an unmount operation of the block volume.

17. The computer program product of claim 13 further comprising:
responsive to the host computer determining that the metadata indicates prior host lock on the block volume, sending, by the host computer, a request to acquire host lock on the block volume to a cloud orchestrator at expiration of a defined time interval.

18. The computer program product of claim 13 further comprising:
retrieving, by the host computer, the metadata of the block volume from a centralized block volume metadata repository, wherein the centralized block volume metadata repository stores a plurality of different metadata for a plurality of different block volumes.

* * * * *